Dec. 20, 1932.  H. A. WISEMAN  1,891,791
STEERING OR TURNING LAMP ARRANGEMENT FOR MOTOR VEHICLES
Filed April 15, 1931   2 Sheets-Sheet 1
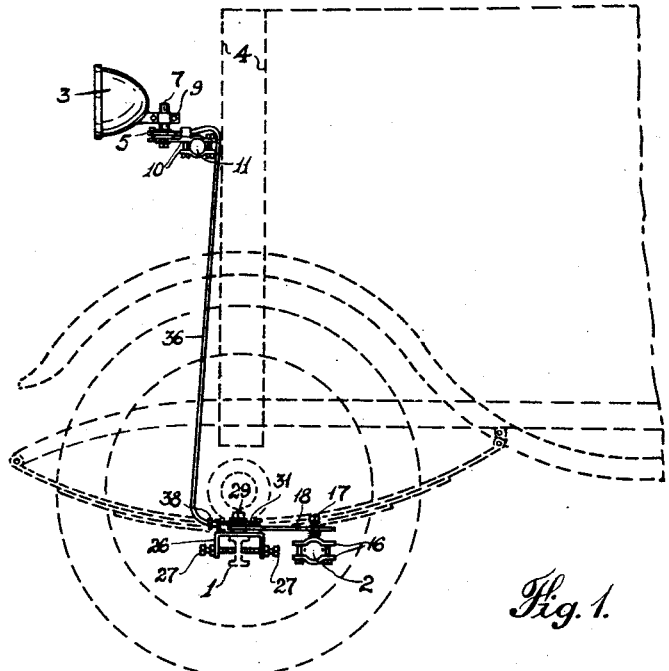
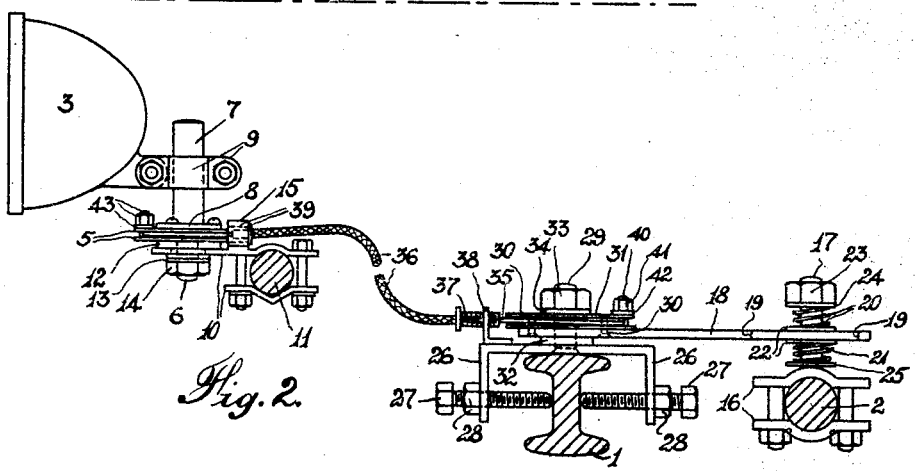
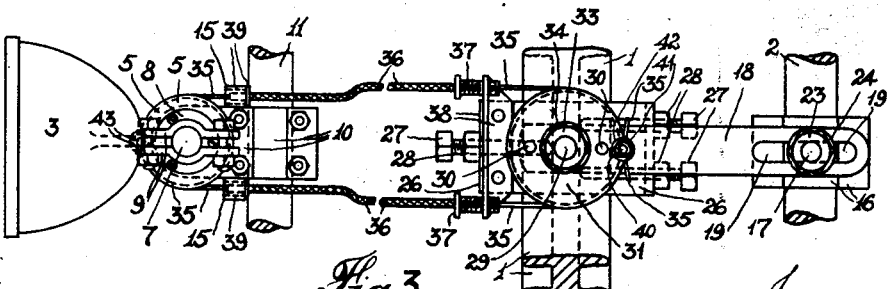
Witness:
Arthur Thompson
Inventor:
Harry Archibald Wiseman Dec. 20, 1932.   H. A. WISEMAN   1,891,791
STEERING OR TURNING LAMP ARRANGEMENT FOR MOTOR VEHICLES
Filed April 15, 1931   2 Sheets-Sheet 2

Witness:
Arthur Thompson

Inventor:
Harry Archibald Wiseman

Patented Dec. 20, 1932

1,891,791

UNITED STATES PATENT OFFICE

HARRY ARCHIBALD WISEMAN, OF HAMANSKRAAL TRANSVAAL, UNION OF SOUTH AFRICA

STEERING OR TURNING LAMP ARRANGEMENT FOR MOTOR VEHICLES

Application filed April 15, 1931, Serial No. 530,279, and in Union of South Africa June 20, 1930.

This invention consists of a new or improved steering or turning lamp arrangement or attachment for use with motor vehicles.

The ordinary fixed headlamps or lights do not adequately or satisfactorily illuminate the road or track in the direction in which a vehicle is being steered when the vehicle is turning a corner or deviating appreciably from a straight course.

The object of the invention is to provide an automatic steering or turning light or lamp or lights or lamps which will throw the light in the direction in which the vehicle is being steered. If one steering or turning light or lamp be employed, then it may most conveniently be arranged centrally between the ordinary fixed headlights; or if two be provided such additional lamps may be arranged at opposite sides of the front of the vehicle. Alternatively, the ordinarily fixed headlamps may be used as the steering or turning lamps.

The steering or turning lamp or lamps are mounted or arranged in the desired position or positions at or near the front of the car, in such a way that they can be turned, or partially rotated, in either direction, or to the right and left, by means which are operated by or from a convenient part of the steering gear or mechanism of the motor vehicle. In this way the movement imparted to the steering or turning lamp or lamps synchronizes with the movement imparted to the front wheels of the vehicle by the steering mechanism. My invention appertains to the means for transmitting the motion from the steering gear to the steering lamps.

The invention will be fully explained with the aid of the accompanying drawings, wherein several practical embodiments of the same are shown. In the drawings, Fig. 1 is a side elevation of an embodiment of the invention in which a single lamp is employed arranged in a central position at the front of the vehicle, the various parts of the invention being shown in full lines, and the outline of a portion of the front of the vehicle being indicated in dotted lines.

Fig. 2 is an enlarged elevation of the various parts of the embodiment of the invention shown in Fig. 1.

Fig. 3 is a plan view of Fig. 2.

Figure 4:
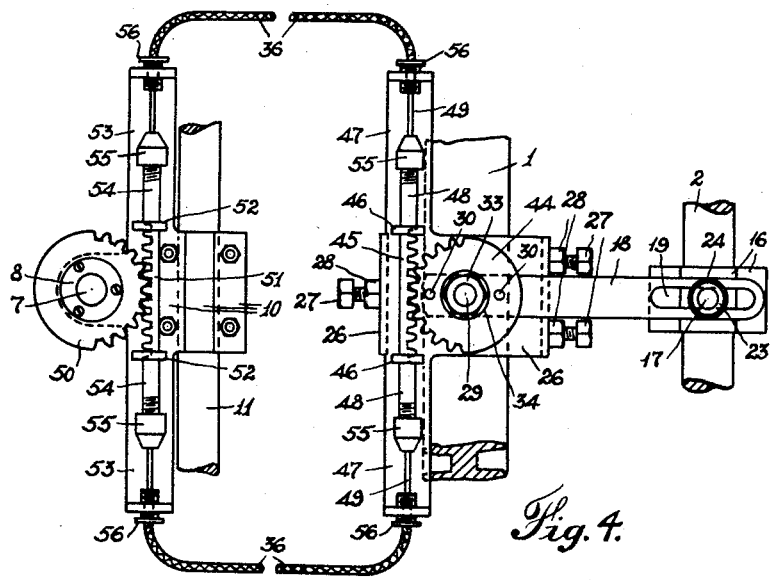
Fig. 4 is a plan view of another embodiment of the invention.

In the embodiment of the invention shown in Figs. 1 to 3, the outline of the front portion of the motor vehicle is shown in Fig. 1 in dotted lines, and includes the front axle 1, and tie rod 2 which connects the front wheels and ordinarily transmits the steering motion from the one to the other.

3 denotes the steering or turning lamp which, in this embodiment, is an additional lamp and is positioned in front of the radiator 4 in a position centrally between the headlamps—not shown. The lamp 3 is shown mounted on a turntable or rotatable element, shown in the form of a horizontally arranged grooved pulley 5, provided with a depending pin or pivot 6. The turntable 5 carries a vertical pin 7 fixed thereto by screws through the medium of a flange 8. The lamp 3 is adjustably fixed upon the pin 7 by a clamp 9.

10 is a clamp bracket fixed upon the rod or bar 11 which extends between and carries the brackets of the ordinary headlamps. The turntable 5 is rotatably secured to the bracket 10 by loosely arranging the pin 6 in a bushing 12 in a hole in the bracket 10, and securing the same in position by means of a washer 13, and nut 14 screwed on the pin 6 beneath the bracket 10. The bracket 10 is constructed at the sides with lugs or projections 15 which are shaped to provide holes for a purpose hereinafter explained.

16 is a clamp secured in a convenient position on the tie rod 2. The upper portion of the clamp 16 is constructed with an upstanding pin or projection 17. 18 is a lever in one end portion of which is formed a slot 19 in which engages and works the pin 17. 20, 21, represent two springs arranged around the pin 17 at opposite sides of the lever 18, and 22 are washers between the inner ends of the springs 20, 21, and the lever 18. 23 is a nut screwed on the pin 17 for retaining the several parts in position, and placing the springs under the requisite tension; 24, 25 being further washers between the nut 23 and spring 20, and spring 21 and clamp 16, respectively. 26 is an adjustable bracket fixed upon the axle 1 in front of the bracket 16 on the tie rod 2. The bracket 26 is shown adjustably secured in position by means of the three set screws 27, having lock nuts 28. The bracket 26 has fixed to it a vertical pin 29, which passes through a hole in the lever 18 and so forms a pivot for said lever 18. The elongated slot 19 permits of the necessary radial movement of the lever 18 when it is moved about the pivot pin 29 by the pin 17 attached to the tie rod 2.

On the end of the lever 18, around the pivot pin 29, there is secured by rivets 30 a turntable or rotatable member in the form of a grooved pulley 31. 32 is a washer placed between the bottom of the lever 18 and the top of the bracket 26, and 33, 34, are nut and washer respectively on the upper screwed end of the pin 29, for retaining the parts in position thereon.

The motion imparted to the turntable 31 is transmitted to the turntable 5 by means of a flexible wire or the like 35, which is adapted to move in flexible casings 36. The casings 36 are attached at one end by adjusting or tensioning hollow screws 37 to a bracket 38 fixed to the top of the bracket 26 at the front; the other ends of the casings 36 being secured by thimbles or bushings 39 in the holes provided in the lugs or projections 15. The wire 35 passes round the grooves in each of the turntables or pulleys 5, 31, and through the casings 36. The ends of the wire 35 are secured to the turntable 31 by means of a screwed pin 40 and nut 41. The pin 40, which passes through a hole in the top flange of the turntable 31 and enters the groove, is provided with a hole for the ends of the wire 35 to be passed through, and the ends are secured by forcing them against the upper side of the groove in the turntable 31 on tightening the nut 41; 42 is a washer positioned on the pin 40 between the nut 41 and turntable 31. The wire 35, at or about the centre of its length, is secured in the groove in the other pulley 5 by means of a similar pin, nut and washer 43.

In the operation of this embodiment of the invention, any movement imparted to the tie rod 2 as a result of the operation of the steering gear or mechanism, imparts angular movement to the lever 18 in the same direction. The lever 18, by rotating the turntable 31 on the pin 29, moves the turntable 5, through the medium of the wire 35, in the same direction. This rotates the pin 7, and with it the lamp 3, in the direction in which the vehicle is being turned or steered.

In the other embodiments of the invention shown in Figs. 4, 5, 6 and 7 of the drawings, the same reference numerals are used as in Figs. 1 to 3 to denote the same or similar parts, in so far as they apply.

In the modification shown in Fig. 4 the motion is transmitted from the lever 18 to the lamp supporting pin or pivot 7 by the following means, viz:—a partially toothed wheel or pinion 44 secured to the lever 18 and mounted on the pin 29; a rack 45 which is moved by the pinion 44 in guides 46 provided on extension 47 of the bracket 26, said rack being provided at its ends with cylindrical extensions 48 to which are attached the one end of each of the two pieces of flexible wire 49, moving in the casings 36; another and similar partially toothed pinion 50 rotatably mounted on the clamp bracket 10 and carrying the lamp supporting pin 7; a rack 51 slidable in guides 52, on extensions 53 of the bracket 10, which rack meshes with and rotates the pinion 50 and attached lamp supporting pin 7; and extensions 54 of the rack 51 to the ends of which are attached the other end of each of the wires 49. 55 are nuts which are screwed on to the ends of the extensions 48, 54, of the racks 45, 51, and serve for adjustably connecting the ends of the wires 49 thereto, and 56 are adjusting or tensioning hollow screws for attaching the ends of the casings 36 to the upstanding ends of the bracket extensions 47, 53.

As the pinion 44 is rotated by the angular movement of the lever 18 off the rod 2, it moves the rack 45, which in turn, through one or other of the wires 49, operates the other rack 51, which rotates the pinion 50 and with it the attached lamp supporting pin 7 and lamp 3—not shown.

Figure 5:
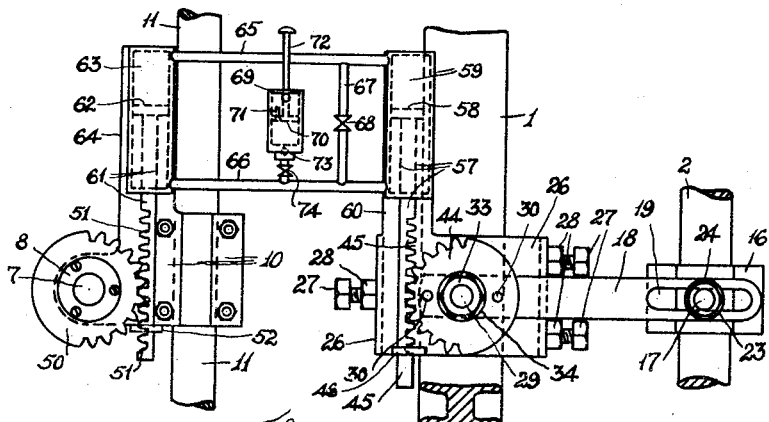
Fig. 5 is a plan view illustrating a further embodiment of the invention.

In the modification shown in Fig. 5, the rack 45 which is operated by the pinion 44 is constructed with an extension 57, which is fitted with a piston 58 working in a cylinder 59 carried by an extension 60 of the bracket 26. The other rack 51, which drives the pinion 50 to rotate the pin 7, is similarly constructed with an extension 61, which is provided with a piston 62, operatively arranged in a cylinder 63 carried on an extension 64 of the bracket 10. The cylinders 59, 63, are placed in communication at the corresponding ends by means of the pipes 65, 66. 67 is a pipe which connects the pipes 65, 66, which pipe 67 is provided with a valve 68 for equalizing the pressure of the oil or other liquid in the pipes 65, 66, and cylinders 59, 63. A pump device is provided for introducing liquid to replenish any loss taking place in the cylinders 59, 63, and tubular connections 65, 66. This device is shown comprising a cylinder 69 in which is arranged a piston 70, fitted with a non-return inlet valve 71 and operating pusher rod 72; 73 being a further non-return valve in the bottom of the cylinder, and 74 a valve between the end of the cylinder 69 and the pipe 66 for opening and closing the cylinder 69 to said pipe 66.

In the operation of this embodiment, the movement of the pinion 44 by the lever 18 drives the rack 45 in a corresponding direction, which causes the piston 54 to displace some of the liquid from the cylinder 59 through pipe 65 or 66 into the other cylinder 63, and moves the piston 62 therein in the opposite direction. This, through the rack 51, drives pinion 50 and the lamp supporting pin 7 fixed thereto.

Figure 6:
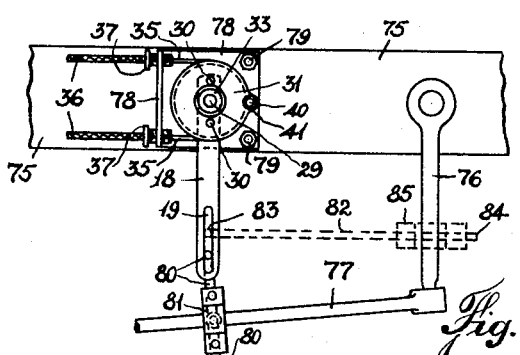
Fig. 6 is a side elevation illustrating an alternative method of actuating the lamp from other portions of the steering gear.

In the modification shown in Fig. 6, 75 represents a portion of the chassis, 76 the steer gear arm and 77 the drag link. In the construction shown in full lines the motion which operates the means which actuates the steering lamp is taken off the drag link 77. 78 is a bracket fixed to the chassis 75 by bolts 79, on which is rotatably mounted the turntable 31. The lever 18 which is fixed to the turntable 31 extends downwardly in the direction of the drag link 77, and at its slotted lower end is connected to the drag link 77 by means of an L-shaped arm or link 80 which at one end engages in the slot 19 in the lever 18 and at the other end is adjustably attached to a clamp bracket 81 which is adjustable along the length of the drag link 77.

As shown in dotted lines in this figure the lever 18 may alternatively be adjustably connected to the steer gear arm 76, so as to operate the lever 18 off said arm instead of off the drag link. For this purpose an L-shaped rod 82 is employed, the bent end 83 of which engages in the slot 19 in the lever 18, the other end 84 being adjustably connected to the steer gear arm 76 by the clamp 85.

Figure 7:
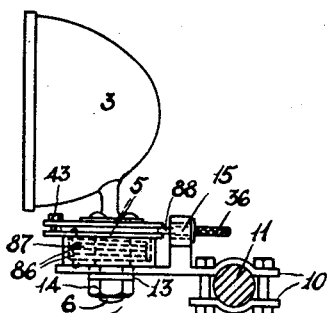
Fig. 7 is a side elevation of the steering or turning lamp incorporating another alternative construction.

In the further form of the invention shown in Fig. 7, a spring 86 is arranged in a box or casing 87 positioned between the turntable 5 and the top of the bracket 10 and secured to the latter. One end of the spring 86 is connected to the turntable 5 and the other end to the box or casing 87. A single wire 88 is employed which is secured in the groove in the turntable 5. In the operation of this form of the invention, when the lamp 3 is in the normal central position the spring 86 is held in compression by the wire 88. The lamp 3 is turned in the one direction by the rotation of the turntable 5 by pulling the wire 88, and in the reverse direction by allowing the spring 86 to turn the turntable 5 under the control of the wire 88.

The angular movement imparted to the lamp 3 in relation to the movement of the lever 18 may, if desired, be increased, to ensure the turning of the lamp more rapidly than, or in advance of, the vehicle wheels. This may be effected in the arrangement according to Figs. 1 to 3, or Fig. 6, or Fig. 7, by decreasing the diameter of the groove in the turntable 5; or in the arrangement shown in Fig. 4 or Fig. 5, by decreasing the size of the pinions 50; or in the arrangement shown in Fig. 5, by decreasing the size of the cylinder 63.

Although I show the invention adapted for turning a single steering lamp, it will be obvious that it could readily be adapted for turning two such lamps positioned at the sides of the front of the vehicle. To this end the turntable 31 could be constructed with two grooves for two wires 35, one leading to a turntable 5 for each lamp; or the turntable 5 of the one lamp could be provided with two such grooves and the motion be transmitted from the one turntable 5 to the other by a wire.

What I claim as my invention and desire to protect by Letters Patent is:—

1. In a steering or turning lamp arrangement for motor vehicles, the combination with the steering gear of the vehicle of a lamp, a rear rotatable element mounted on a fixed portion of the vehicle and adjustable longitudinally and transversely of said portion, means in the form of a lever, which at one end is rigidly connected to and rotates said rear element off a portion of the steering gear, and is slotted at its other end to engage with the steering gear, means for resiliently connecting said slotted end of the lever to the steering gear, a rotatable element mounted at the front of the vehicle and carrying the lamp, and flexible means for rotating said front rotatable element off the rear rotatable element, as set forth.

2. In a steering or turning lamp arrangement for motor vehicles, the combination with the steering gear of the vehicle of a lamp, a rear rotatable element mounted on a fixed portion of the vehicle and adjustable longitudinally and transversely of said portion, means in the form of a lever, which at its one end is rigidly connected to and rotates said rear element off a portion of the steering gear, and is slotted at its other end to engage with the steering gear, means for resiliently connecting said slotted end of the lever to the steering gear, a rotatable element mounted at the front of the vehicle and carrying the lamp, and adjustable flexible means made of wire and working through an adjustable flexible casing for rotating the front rotatable element off the rear rotatable element, as set forth.

3. In a steering or turning lamp arrangement for motor vehicles, the combination with the steering gear of the vehicle of a lamp, a rear rotatable peripherally grooved element, a bracket, adjustable both longitudinally of and transversely of the front axle of the vehicle, for adjustably securing said rear element to said front axle, a slotted lever attached to and operating said rear rotatable element, a pin fixed to the tie rod of the steering gear, with which the slotted end of the lever engages, spring means on the pin for resiliently retaining the slotted end of the lever thereon, a peripherally grooved rotatable element arranged at the front of the vehicle, a bracket attached to a fixed part of the vehicle for carrying said front rotatable element, a pin carried by said front rotatable element to which the steering lamp is fixed, and flexible means made of wire working through flexible casings adjustable as to length, said wire being adjustably secured at a point in the grooves of the front and rear rotatable elements, for rotating the front rotatable element off the rear rotatable element, as set forth.

4. In a steering or turning lamp arrangement for motor vehicles, the combination with the steering gear of the vehicle of a lamp, a rear rotatable peripherally grooved element, a bracket, for securing said rear element to the chassis of the vehicle, a slotted lever attached to and operating said rear rotatable element, a pin adjustably fixed to the steering gear between the pivoted end of the drag link and the tie rod, with which the slotted end of the lever engages, a peripherally grooved rotatable element arranged at the front of the vehicle, a bracket attached to a fixed part of the vehicle for carrying said front rotatable element, a pin carried by said front rotatable element to which the steering lamp is fixed, and flexible means, made of wire working through flexible casings adjustable as to length, said wire being adjustably secured at a point in the grooves of the front and rear rotatable elements, for rotating the front rotatable element off the rear rotatable element, as set forth.

5. In a steering or turning lamp arrangement for motor vehicles, the combination with the steering gear of the vehicle of a lamp, a rear rotatable element mounted on a fixed portion of the vehicle and adjustable longitudinally and transversely of said portion, means in the form of a lever, which at its one end in rigidly connected to and rotates said rear element off a portion of the steering gear, and is slotted at its other end to engage with the steering gear, means for resiliently connecting said slotted end of the lever to the steering gear, a rotatable element mounted at the front of the vehicle and carrying the lamp, adjustable flexible means made of wire working through a flexible casing and secured to the rear and front rotatable elements for rotating the front rotatable element off the rear rotatable element in one direction, and a spring for rotating the front rotatable element in the other direction, as set forth.

In testimony whereof I have signed my name to this specification.

HARRY ARCHIBALD WISEMAN.